3,369,964
PRESERVATION OF WOOD
Geoffrey H. Beames, Orlando, Fla., assignor to Allied
Chemical Corporation, New York, N.Y., a corporation
of New York
No Drawing. Filed Mar. 25, 1965, Ser. No. 442,811
7 Claims. (Cl. 167—30)

The present invention relates to novel wood preservative compositions and more particularly to compositions containing as active ingredient a ketonic compound having the empirical formula $C_{10}Cl_{10}O$ and to compositions containing as active ingredient, in combination, said ketonic compoud and pentachlorophenol.

The ketonic compound of the present novel compositions is a complex chlorinated polycyclic ketone having the structural formula:

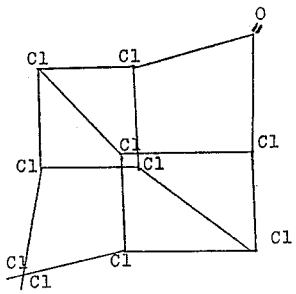

which has been designated as decachlorooctahydro-1,3,4-metheno-2H-cyclobuta(cd)pentalen-2-one. This compound is a white crystalline solid having a molecular weight of 490.68 and sublimes with some decomposition when heated in the open atmosphere to 300° C.

The ketonic compound may be conveniently prepared by condensing two molecules of hexachlorocyclopentadiene with the aid of sulfur trioxide to form a hexachlorocyclopentadien reaction product and hydrolyzing the reaction product to the ketonic compound.

The attack of fixed and floating wooden structures in salt or brackish waters by certain wood-boring animals known as marine borers has been responsible for extensive damage not capable of monetary computation. In the United States these marine animals are especially active along the Gulf and Southern Atlantic coasts. They are capable of completely destroying untreated piles and other structural timbers in less than a year. Among the most common offenders are the molluscan borers of the genera Teredo and Bankia, commonly known as shipworms, and the crustacean borer of the genera Limnoria. Shipworms frequently bore for several feet at right angles with the grain into a pile, for example, and then begin to burrow in a longitudinal direction, following a very irregular course, thereby reducing the structural strength of the pile so that it will fracture under the slightest stress. Limnoria, on the other hand, bore shallow burrows, but they establish large colonies that literally honeycomb the surface of the pile. The eroding action of the sea or other agencies then remove the outer layers of wood, exposing new wood for further attack. As a result of this localized destruction, heavy infested piling and similar structural timbers tend to assume a distinctive hourglass shape in the tidal zone.

To preclude attack of these and similar noxious marine organisms, the use of various types of external coverings such as sheet metal, concrete casing and paint coatings, which act as barriers to the entrance of the marine borers into the wood have heretofore been proposed. In general, these methods have proven to be unsatisfactory due to corrosion of the metal in sea water, high cost of concrete installations, ability of the marine borers to attack unprotected portions of the wood, fragility of paint coatings when exposed to wave action, drifting objects when exposed to sea water, as well as for numerous other reasons. More satisfactory and practical results have been obtained by impregnating the wood exposed to the sea with water-insoluble preservatives such as creosote and with petroleum oil solutions containing chemical additives such as pentachlorophenol and copper naphthenate. However, these preservatives generally afford only slight protection against many of the crustaceon and molluscan borers. Even when creosote, a commercially available wood preservative, is used at maximum retention levels, the attack of crustacean borers such as Limnoria and molluscan borers such as Teredo and Bankia is not sufficiently curtailed to prevent extensive damage over long periods of time. Other oil preservatives containing chemical additives are in some instances readily leached out of the wood or the chemical contained therein detoxified when exposed to sea water, thus providing little protection of the wood against these marine animals.

Accordingly, it is an object of the present invention to provide new and more effective compositions for inhibiting attack of wood exposed to sea water by marine borers without the accompanying shortcomings of the prior art preservatives.

A still further object is to provide a method of preserving wood which is to be exposed to sea water for long periods of time from attack by marine borers.

It has been unexpectedly found that compositions containing as active ingredients decachlorooctahydro-1,3,4-metheno-2H-cyclobuta(cd)pentalen-2-one and compositions containing mixtures of said ketonic compound and pentachlorophenol, when dissolved in an organic solvent therefor, exhibit effective inhibition of attack of wood exposed to sea water by marine borers. It has been discovered that these compositions are not only capable of inhibiting attack of certain marine borers controlled by the aforementioned prior art preservatives, but are capable of controlling the entire spectrum of marine fouling animals encountered in natural sea water conditions. More particularly, it has been found that the present compositions provide greater long-range protection of wood against all varieties of marine borers, including the crustacean borer Limnoria and the molluscan borers Teredo and Bankia than any commercial preservative now available.

The ketonic compound of the novel compositions may be present in anhydrous form or as a technical hydrate containing up to about 13 percent of water. In either the anhydrous or hydrate form, the ketonic compound is very soluble in many organic solvents such as lower aliphatic alcohols, ethers, and ketones, but is virtually insoluble in cold water and in largely aqueous systems and only slightly soluble (less than 0.4 percent) in boiling water.

The pentachlorophenol employable in the present compositions may be present in pure form or as a technical mixture. Pentachlorophenol, meeting the requirements of Federal specification TT–W–570 of June 20, 1947, is especially suitable in the compositions contemplated herein. This specification requires that pentachlorophenol shall contain not less than 95 percent chlorinated phenols determined by titration of hydroxyl group and calculated as pentachlorophenol when tested as described. It is also required that the matter soluble in sodium hydroxide solution shall not exceed 1 percent and that the freezing point shall not be lower than 174.0° C.

The novel compositions of the present invention are prepared by simply dissolving the ketonic compound or mixtures of the ketonic compound and pentachlorophenol, in any suitable organic solvent. The compositions may then be applied to the wood sought to be preserved by any conventional manner. The process selected to impregnate the wood with the present compositions is obviously dependent upon the degree of penetration and amount of retention (solution uptake) desired. These processes may be effected by impregnating the preservative solution into the wood under pressure in closed cylinders or by non-pressure methods such as by dipping, steeping or soaking the wood sought to be preserved in the preservative solution or by brushing or spraying the wood with the preservative solution. In general, pressure treatments afford a deeper and more uniform penetration and a higher absorption of preservative and thus provide a more effective protection to the wood. In addition, treating conditions in pressure treatments may be so controlled that retention and penetration can be varied to meet the requirements of service, thus resulting in more economical use of preservative.

A typically effective pressure treatment employable pursuant to the present invention is the full-cell process since this process permits injection of maximum quantities of preservative solution normally required for the preservation of wood exposed to sea water environment. In accordance with this process, seasoned or suitably conditioned wood is placed in a closed cylinder and a preliminary vacuum is drawn on the charge. This vacuum is maintained for 15 minutes to an hour and then, without admitting air, the cylinder is completely filled with hot preservative oil, after which additional oil is forced into the retort to build up the required pressure. Pressure generally reaches a maximum of 125–200 p.s.i. and is maintained until the desired absorption is attained. The temperature of the preservative is normally elevated, usually about 70° C. to 100° C., being governed by the character of the oil used. When the required amount of preservative has been injected into the wood, the pressure is released and the oil drained from the cylinder. A short final vacuum may be optionally applied to dry the surface of the timber if desired.

The conditions used in applying the preservative solutions onto the wood are not critical. The adequacy of the treatment in each case is determined by the amount of preservative absorbed and retained by the wood, the depth to which it has penetrated and the distribution of preservative throughout the treated zone, and these facors vary with the specific uses to be made of the wood. Operable temperatures normally range from room temperature up to about 100° C. for pressure as well as non-pressure treatments, although temperatures above 100° C. may be used in pressure treatments. Satisfactory results may be readily obtained at pressures up to about 250 p.s.i. when pressure treatments are employed. Immersion times for the treatments may range from a few seconds up to several days. To insure adequate long-range protection against marine borers, the compositions of the present invention are generally impregnated into the wood to retention levels of at least about 10 pounds per cubic foot. The wood is completely impregnated, with even distribution throughout, with the composition of the present invention for best results.

The solvents which are useful for purposes of formulating the compositions of the present invention include cresotes, light and heavy petroleum fuel oils, aromatic coaltar solvents, oils of essential aromatic character or any other oil that is capable of dissolving sufficient quantities of the active ingredient, capable of impregnating the wood to be treated to the desired degree and is resistant to being readily displaced or leached by water. Creosotes and petroleum oils are particularly outstanding solvents. The creosote employable herein may be derived from any convenient source. Coal-tar, lignite-tar, oil-tar, water-gas-tar and wood-tar creosotes are all suitable as solvents for the present compositions. Coal-tar creosotes are especially preferred due to their relative insolubility in water, low volatility, ease of application, general availability and relatively low cost. Any coal-tar creosote meeting the requirements of the standard specification (P1–54) of the American Wood Preservers Association gives generally satisfactory results. In general, petroleum oils corresponding to fuel oils number 1 to 3 are effective when non-pressure treatments are employed in the treatment of the wood. Petroleum oils having a specific gravity not greater than 35 A.P.I. at 60° F., with a viscosity not greater than 70 Saybolt Universal seconds at 100° F., an ASTM flashpoint of not less than 175° F. and an ASTM distillation range such that not more than 50 percent by volume is distilled below 500° F. and not more than 90 percent by volume is distilled below 600° F. are acceptable when pressure treatments of the wood are desired. Mixtures of the above solvents may also be employed. The use of an auxiliary solvent is also contemplated, for example, to aid in the dissolution of the active ingredient when the primary solvent is incapable of dissolving the desired quantity of the active ingredient.

Solution concentrations of the active ingredients dissolved in the solvent have not been proven to be critical, provided an effective minimum amount of such ingredient is initially employed. A typical minimum concentration of the active ingredients dissolved in the solvent resulting in improved protection to wood exposed to attack by marine borers is about 1 percent by weight of the solvent. The maximum concentration of active ingredient employable is limited only by its solubility in the particular solvent used. In general no increased benefit has been derived by increasing the concentration of the active ingredient to above about 25 percent based on the weight of the solvent. Since the ketonic compound and pentachlorophenol are virtually insoluble in water while being extremely soluble in the solvent, the preferential loss of these active ingredients by leaching is kept to a minimum and protection is afforded to the wood at minimum concentrations so long as the solvent itself has not been displaced with water or completely leached. Furthermore, since the active ingredients of the present invention are not detoxified or fixed chemically in the interior of the wood when exposed to sea water, minimum concentrations of these active ingredients have proved to be eminently satisfactory to obtain the desired improved results.

When the ketonic compound is used in combination with pentachlorophenol, the proportions of these active ingredients used in preparing the compositions of the invention may also be varied. The weight ratio of the ketonic compound to the second preservative material may vary from 1:1 to 1:4, but ordinarily the ketonic compound will preferably be present in a proportion about equal to that of the second preservative material. Compositions wherein the ketonic compound and pentachlorophenol are each present in a minimum total concentration of 5 percent by weight of the solvent have been found to exhibit outstanding activity for inhibiting attack by marine borers.

The compositions of the present invention have been found to be effective when applied to seasoned or otherwise conditioned wood. The nature of the wood treatable to obtain the desired improvement is of no consequence and woods both hard and soft obtained from various geographical locations may be suitably treated to realize effective inhibition of marine borer attack. Southern pine and Douglas fir, two native woods upon which major dependence has been placed as a source for piling, ties, poles and structural timbers are typical examples of woods treatable in accordance with the present invention.

The prolonged marine borer attack inhibiting characteristics of the compositions of the present invention are demonstrated in the following example.

*Example*

Southern pine sapwood blocks (¾ inch cubes) with a ⅛ inch hole drilled through the center of the faces of each block that are most nearly parallel with the grain were prepared in accordance with ASTM method D1413–

56T, "Tentative Method of Testing Wood Preservative by Laboratory Soil-Block Cultures." The blocks were dried overnight in a circulating-air oven at 105° C., weighed and placed in a wide-mouth glass bottle. The glass bottle was placed in a vacuum desiccator which was then evacuated to a pressure of 5 mm. of mercury and held at that pressure for 15 minutes. The blocks were treated by the full-cell method to given retention levels (solution uptake) with different preservative solutions consisting of the ketonic compound, pentachlorophenol, mixtures of the ketonic compound and pentachlorophenol and copper naphthenate in coal-tar creosote and in heavy petroleum oil as solvents. This treatment was effected by allowing the treating solution at a temperature of 75° C. to flow from a separatory funnel into the bottle without breaking the vacuum. After the blocks were covered, the desiccator was allowed to return to atmospheric pressure and the blocks were left in the solution for at least 1 hour. After removal from the solution, the blocks were placed in weighing bottles and were weighed. In order to treat blocks to the desired retention levels, the treating solutions were diluted to varying degrees with toluene. Retentions were calculated from the concentration of treating solutions in toluene and the amount of diluted solution that was absorbed by the blocks. After treatment, the blocks were strung for one week in a well-ventilated hood to allow the toluene to evaporate.

Technical decachlorooctahydro - 1,3,4 - metheno - 2H-cyclobuta(cd)pentalen-2-one, 95.6 percent pure, containing 3.0 percent water and 1.4 percent inactive organics; technical pentachlorophenol (95 percent assay chlorinated phenols) and technical copper naphthenate were used as the additives in the preparation of the preservative solution.

Characterization data for the solvents used to prepare the preservative solutions are as follows:

TABLE I

|  | Creosote | Petroleum oil |
|---|---|---|
| Specific gravity, 38/15.5° C | 1.082 | 0.943 |
| 5-ball-column distillation, percent by weight distilling: | | |
| Below 210° C | 6.5 | 1.6 |
| 210–235° C | 13.9 | 1.7 |
| 235–270° C | 12.2 | 8.9 |
| 270–315° C | 21.9 | 18.0 |
| 315–355° C | 24.9 | 33.3 |
| Residue | 19.6 | 33.7 |
| Loss | 1.0 | 2.8 |
| Glycol-insoluble, percent by volume | 44 | 90 |

The treated blocks were strung on heavy nylon lines and exposed to natural sea water conditions to determine the effectiveness of the preservatives impregnated into the blocks to prevent attack by marine borers. The lines were hung horizontally in the water off the Florida coast just below mean low-tide level, thus affording placement of all blocks in a zone containing large quantities of marine borers, including those of the genera Limnoria, Teredo and Bankia, which are particularly difficult to control. After being exposed to sea water for 24 months, the blocks representing each of the treatments were removed from the water, cleaned, inspected for borer damage and rated for resistance to marine borer attack. The results obtained at the nominal retention levels indicated are as follow:

(TABLE II)

| Preservative | Solvent | Preservative Concentration (percent by wt.) | Preservative Rating After 24 Months' Exposure [1]—Nominal Retention (lb./cu. ft.) | | |
|---|---|---|---|---|---|
| | | | 5 | 15 | 25 |
| Ketonic Compound | Creosote | 5.0 | 5.0 | 8.3 | 9.3 |
| 50/50 Ketonic Compound/Pentachlorophenol | do | 5.0 | 4.0 | 7.0 | 9.5 |
| 20/80 Ketonic Compound/Pentachlorophenol | do | 5.0 | 2.0 | 8.0 | 9.5 |
| Pentachlorophenol | do | 5.0 | 2.0 | 5.3 | 9.0 |
| Copper naphthenate [2] | do | 5.0 | 0 | 6.7 | 8.0 |
| | Creosote [2] check | 0.0 | 0 | 6.0 | 7.3 |
| Ketonic Compound | Petroleum | 5.0 | 1.3 | 7.0 | 8.7 |
| Pentachlorophenol [2] | do | 5.0 | 0 | 0 | 0 |
| Copper naphthenate [2] | do | 15.0 | 0 | 0 | 4.3 |
| | Petroleum check | 0.0 | 0 | 0 | 0 |

[1] The rating system used in this work is: 10—No more than a trace of attack by marine borers; 9—light attack; 7—moderate attack; 4—heavy attack; 0—very heavy attack or block destroyed.
[2] Commercially available wood preservative.

It is evident from the above results that compositions of the present invention are capable of more effective prevention of attack by marine borers at equivalent dosages than commercially available oil-soluble wood preservatives.

Inspection of the nature of damage caused by the various marine organisms for each of the above preservative systems indicated that compositions containing the ketonic compound were the only preservative systems capable of completely inhibiting attack by Limnoria and were more effective in inhibiting attack by the shipworms Teredo and Bankia than any other preservative system tested.

The compositions contemplated herein may be modified, if desired, by the addition thereto of varying amounts of water repellents, wetting agents, bloom suppressants, penetration assistants or other materials having a favorable action on the impregnation or penetration of the compositions or for a desirable action in further protecting the treated article.

While in the foregoing specification this invention has been described in relation to certain specific embodiments thereof and details have been set forth for the purpose of illustration, it may be apparent to those skilled in the art that the invention is adoptable to other embodiments and many of the details set forth herein may be varied considerably without departing from the basic concept of the invention.

I claim:

1. The method which comprises exposing to natural sea water wood rendered resistant against attack by marine borers by treatment with an organic solvent containing dissolved therein as active ingredient an effective amount of a material selected from the group consisting of decachlorooctahydro - 1,3,4 - metheno - 2H - cyclobuta(cd)pentalen - 2 - one and mixtures of decachlorooctahydro - 1,3,4 - metheno - 2H - cyclobuta(cd)pentalen-2-one and pentachlorophenol.

2. The method as defined in claim 1 wherein the active ingredient is decachlorooctahydro - 1,3,4 - metheno - 2H - cyclobuta(cd) - pentalen - 2 - one.

3. The method as defined in claim 1 wherein the active ingredient is a mixture of decachlorooctahydro - 1,3,4 - metheno - 2H - cyclobuta(cd)pentalen - 2 - one and pentachlorophenol.

4. The method as defined in claim 1 wherein the solvent is a creosote.

5. The method as defined in claim 1 wherein the solvent is a petroleum oil.

6. The method as defined in claim 1 wherein the solvent is a mixture of creosote and petroleum oil.

7. The method as defined in claim 1 wherein said active ingredient is present in a concentration of at least 1 percent based on the weight of the solvent.

References Cited

UNITED STATES PATENTS

| | | | |
|---|---|---|---|
| 2,616,825 | 11/1952 | Gilbert | 167—30 |
| 3,065,087 | 11/1962 | Goldstein | 167—13 |

FOREIGN PATENTS

| | | |
|---|---|---|
| 908,620 | 10/1962 | Great Britain. |
| 147,346 | 7/1952 | Australia. |

OTHER REFERENCES

Scheflan, The Handbook of Solvents, D. Van Nostrand Co., Inc., New York, N.Y., pp. 79, 586 and 587 (1956).

Behr, Pests, March 1949, pp. 19, 20 and 22.

ALBERT T. MEYERS, Primary Examiner.

JULIAN S. LEVITT, Examiner.

J. D. GOLDBERG, Assistant Examiner.